Dec. 16, 1952  R. E. DARLING  2,621,875
PERSONAL EQUIPMENT FOR AIRCRAFT PILOTS
Filed Jan. 24, 1950  2 SHEETS—SHEET 1
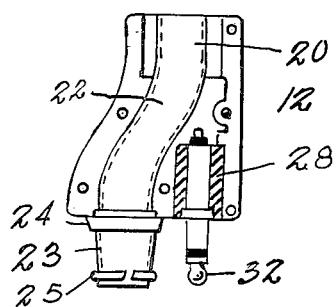
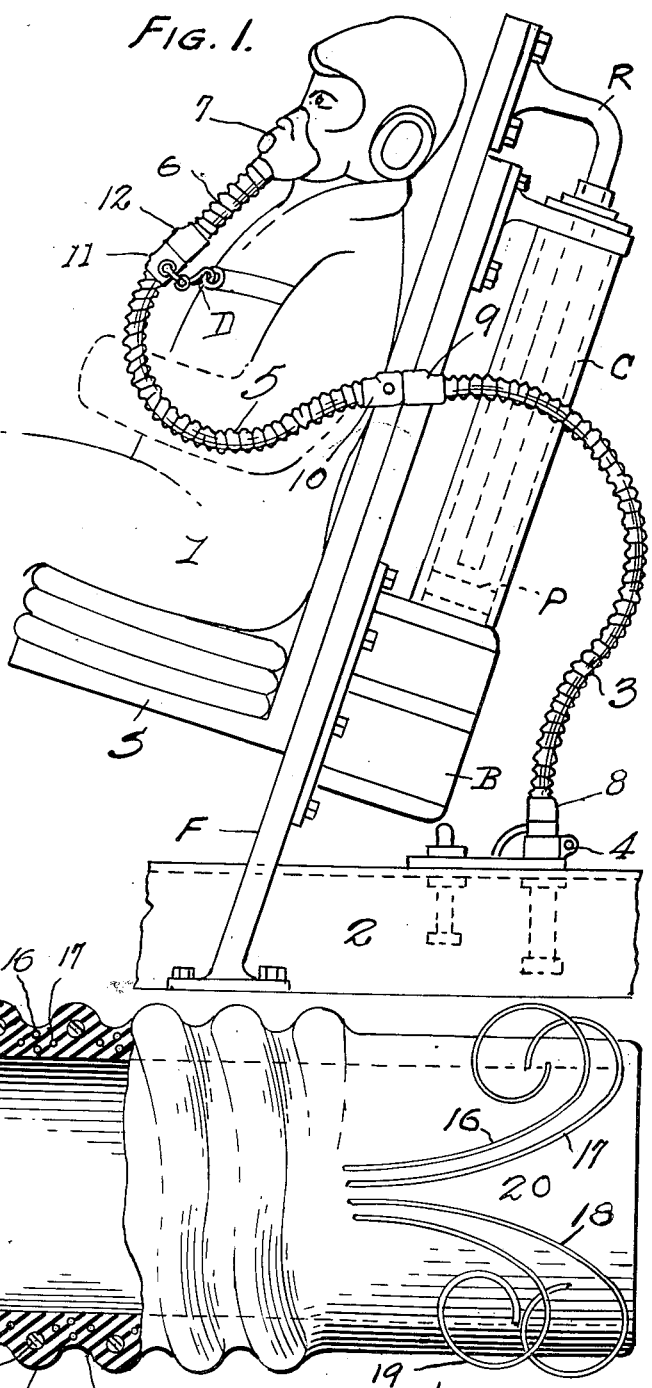
INVENTOR
RALPH E. DARLING
By Charles K Davies & Son
Attys Dec. 16, 1952          R. E. DARLING          2,621,875
PERSONAL EQUIPMENT FOR AIRCRAFT PILOTS
Filed Jan. 24, 1950          2 SHEETS—SHEET 2
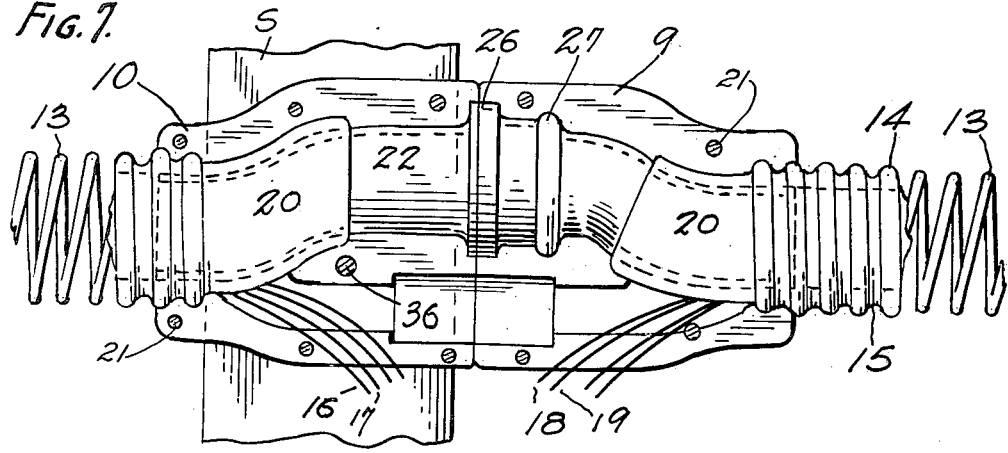
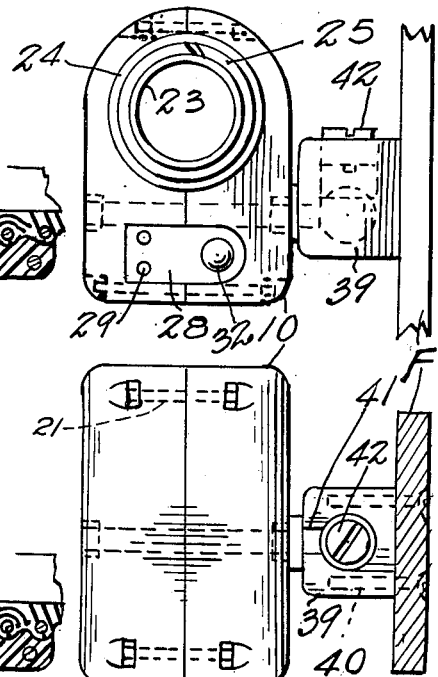
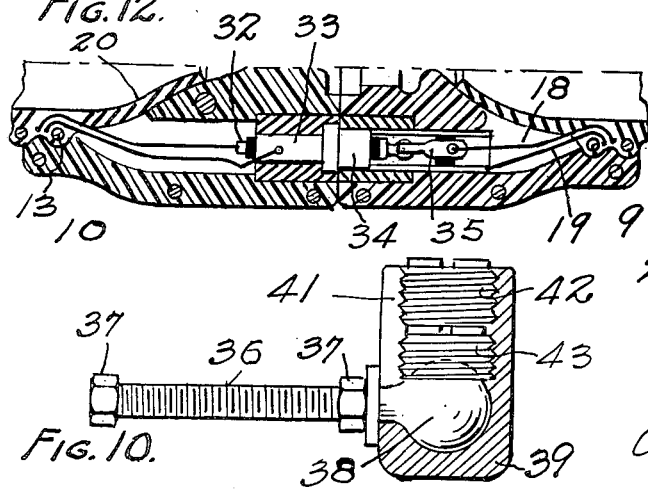
INVENTOR.
RALPH E. DARLING
BY
Charles K. Davies & Son
Attys Patented Dec. 16, 1952

2,621,875

UNITED STATES PATENT OFFICE 2,621,875

PERSONAL EQUIPMENT FOR AIRCRAFT PILOTS

Ralph E. Darling, Bethesda, Md.

Application January 24, 1950, Serial No. 140,171

7 Claims. (Cl. 244—122)

1

The present invention relates to improvements in the general class of aeronautics, and more specifically to personal equipment for aircraft pilots and others, embodied in a quick disconnect assembly of the pilots smooth bore oxygen breathing gear, or system, for use in high-speed aircraft while in flight and from which a pilot may with safety be automatically launched or ejected from the cockpit, with his seat and parachute, through an open canopy into space, preparatory to becoming airborne by the parachute.

The novel oxygen equipment or gear includes a standardized type of trunk line hose, and a sectional extension thereof forms the pilots hose to provide a continuous and reliable flow of air and oxygen under pressure to the pilots mask; and the hose assembly also carries electrical circuits to earphones, microphone, radio or other electrical instruments for serving the pilot.

The trunk line hose or console attachment, and its extension forming the pilots hose, are of reinforced elastic and resilient material, and they are adapted for interchangeable or selective use with existing gearing; the standardized hose sections are equipped with invisible and unobstructed electrical wires or conductors, and the hose sections are jointed by means of separable connectors each consisting of plug and socket units that are provided with coacting fasteners, and electrical contacts or terminals forming automatically operating switches, or circuit makers and breakers.

The adjoining ends of a sectional hose are united by a two unit disconnect or connector, and the two sections of the hose are safely combined and arranged for quick and automatic separation by and with the initial movement of the ejection operation of the aviator and his seat. The separation or disconnection of the pilots hose section with the pilots ejected seat from the trunk line or console section of hose is facilitated and assured with safety by a swivel anchor of the pilots hose section on the pilots seat. Upon operation or upward movement of the ejection seat, the seat-mounted and swiveled connector is axially alined with the component force of ejection, and therefore a quick, positive disconnection is effected without affecting the pilot or aviator.

The novel gearing of the invention involves a minimum number of standardized parts that may be manufactured with facility, the parts may be assembled and adjusted with ease preparatory to an air flight by the pilot, and the mechanical and electrical parts of the equipment are combined and arranged to insure safety, durability, a maximum of efficiency, and with a minimum of bulk and weight, and to occupy a minimum of space in the cockpit of the aircraft.

The invention consists in certain novel features of construction, and combinations and arrangements of parts, as will hereinafter be described and more particularly set forth in the appended claims.

In the accompanying drawings I have illustrated one complete example of a physical embodiment of my invention wherein the parts are combined and arranged in accord with one mode I have devised for the practical application of the principles of the invention. It will however be understood that changes and alterations are contemplated and may be made in these exemplifying drawings, and mechanical and electrical structures, within the scope of my claims, without departing from the principles of the invention.

Figure 1 is a diagrammatic view, in side elevation, showing a pilot in his seat and means for ejecting the occupied seat, together with the arrangement of the oxygen breathing hose equipped with the required electrical connections.

Figure 2 is an inner face view of a section of a plug unit of a connector or disconnect, as for instance shown with the pilots hose; and Figure 3 is a face view of this connector.

Figure 4 is an inner face view of a section of the complementary socket unit, as of the pilots connector; and Figure 5 is an end view of this socket unit of the connector.

Figure 6 is an enlarged detail view partly in section at one end of a reinforced hose section, showing also the electrical circuit wire integrated in the wall of the hose.

Figure 7 is an inner face view of sections of the units of the swiveled connector, with end portions of hoses clamped within the sectional units of the connector.

Figure 8 is a detail elevation of the swiveled connector unit and its seat support; Figure 9 is a top plan view of this structure; and Figure 10 is an enlarged detail sectional view of the mount for the swivel bolt.

Figures 11 and 12 are detail sectional views, broken away, showing the plug and socket connections in a connector for the electrical circuits.

In order that the general arrangement and utility of parts may readily be understood, reference is made to Fig. 1 where a portion of a fixed frame F is located in the cockpit of an aircraft, and from which the pilots seat S may be launched or ejected upwardly at the usual incline through the open upper canopy of a cockpit. For this purpose any suitable mechanism may be employed, as for instance the back of the seat may be equipped with power operated mechanism such as a rod or bar R that initially extends downwardly into the interior of a cylinder C forming an expansion chamber and rigidly mounted upon the frame F. The base B of the cylinder, which forms a firing or explosion chamber, is equipped with means such as an explosive charge, which by detonation and expansion of gases of combustion against a piston P, causes the piston to contact the lower end of the rod for ejecting the seat and the pilot occupying the seat.

Thus, after the canopy over the cockpit has been jettisoned in usual manner, the customary action of the pilot by pulling down a flexible protective covering over his face, activates the ejecting mechanism, and after the ejecting operation the pilot unfastens his safety belt to free himself from the seat, and he finally pulls the ripcord to open his parachute for a descent.

The invention embodies the personal gear or equipment of the pilot including his flying suit 1, with the body hose or lead (not shown) for anti-G pressure from the console receptacle 2, and the oxygen breathing trunk hose 3 of rubber or other suitable material that is anchored at 4 to the console.

A sectional extension of the trunk line includes separable hose sections 5 and 6, one end of the former being anchored to the seat S, and an end of the latter being attached to the mask 7 for use by the pilot. The lower end of the trunk line is equipped with a connector unit 8 that anchors it to the console receptacle, and the upper end of this hose is equipped with a socket connector unit 9 that is detachably connected with a plug unit 10 mounted at one end of the extension 5, and this plug unit of the pilot's hose is swiveled or, pivoted on a portion of the pilot's seat S, as will be described.

The extensions 5 and 6 forming the pilot's hose and attached to the mask 7 are connected by units 11 and 12 of a disconnect or connector, and the extension forming the pilot's hose may be loosely supported or suspended from the pilot's suit, or the parachute harness, as by means of a snap hook D that is mounted on the socket unit for use with a complementary eyelet or the harness or suit. Preferably the rearwardly extending pilot's hose passes under the left arm of the pilot to the swiveled connector unit 10 that is mounted on the left side of the pilot's seat.

Each of these reinforced, elastic and resilient, non-collapsible and standardized hose sections, has integrated in its wall a helical or spirally arranged spring 13 that is encased or embedded within an exterior continuous spiral rib or ridge 14, to add strength and resiliency to the rubber or other elastic material of the hose.

In addition to the function of conveying breathing oxygen to the pilot, the hose sections also form carriers for the electrical circuit wires of the pilot's earphones, radio, microphone, or other instruments of his equipment, and these wires or conductors are embedded in or integrated with the walls of the hose sections to insure against breakage, short circuiting, or entanglement with other accessories. The conductor wires, which are located between the coils of the spiral reinforcing spring, also reinforce the elastic walls of the sections against excessive lateral pressure and expansion that would deform the hose, as the oxygen under pressure flows through the hoses.

The continuous exterior spiral ribs of each hose section form a continuous spiral groove 15 in the wall of the hose, and within the hose wall a suitable number (here shown as four) of lead wires, or spirally arranged electrical conductors 16—17 and 18—19 are encased to form two electrical circuits.

The opposite ends of these wires pass outwardly through the base portions of integral end nipples or attaching sleeves 20 of the elastic hose, for connection with pairs of electrical contacts or terminals mounted within the hollow plug and socket units of a connector or disconnect.

Each of the several enumerated connectors that form detachable joints between the hose sections consists of a socket unit and a plug unit of suitable material, and each unit is made up of complementary sections having interior voids, the sections of each unit being united by suitable clamping means such as screw bolts 21 and countersunk clamp nuts.

Within each sectional unit of a connector is encased an oxygen connector tube as 22, of aluminum, hardened plastic, or other appropriate material, and over a plane end of each angular connector tube the attaching sleeve 20 and one or two of the spiral ribs 14 of the oxygen hose are fitted and securely clamped within the sectional connector units.

The connector tube, or lining 20 of a plug unit terminates in a tapered tubular projecting head or plug 23 having an exterior packing gasket 24, and this plug or attaching head is equipped with an exterior split resilient ring 25 forming part of a snap joint for insertion into a complementary socket 26 of the lining tube in the socket unit of the connector. The end socket 26, which receives the attaching plug, is fashioned with an exterior annular rib 27 that forms an inner annular groove or seat for the resilient split ring, and this connection provides an ample breaking force, for instance eighty pounds, that is sufficient to preclude inadvertent disconnection of the jointed hose sections, or other joints.

The two pairs of wires for the electrical circuits are attached to two sets of detachable terminals or contacts that are preferably mounted in inset insulating blocks, as 28, which extend transversely of the plug and socket units and are rigidly clamped or fixed between the adjoining sections of a unit. The insulating block of a plug unit has embedded therein a pair of contact pins 29, as best seen in Fig. 11, which are inserted within and coact with a complementary pair of sockets or conducting tubes 30 that are fixed within the insulating block of the socket unit of a connector.

For connecting the wires of the other electrical circuit the plug unit of a connector is equipped with a composite plug or jack including a central pin 32 having a spherical contact head, which is encased within and insulated from a conducting sleeve 33, and the respective wires are attached to the central pin and its insulated jacket or sleeve. The complementary socket unit of this electrical connection includes a semi-cylindrical or cut-away conducting tube 34 embedded in an insulating block and to which one wire is attached, and a resilient conducting blade 35, for frictional engagement with the spherical conducting head of the plug, is mounted in and insulated from the conducting tube and connected to the other circuit wire.

The plug unit 10 of the swiveled connector is pivotally suspended or supported upon a transversely arranged bolt 36 that is secured at opposite sides of the unit by clamp nuts 37 preferably countersunk in the opposite faces of the unit. The swivel bolt is fashioned with an enlarged spherical head of ball 38 that is pivotally mounted in a threaded socket block or holder 39, and the holder or socket block is secured in suitable manner against the front face of the pilots seatback, as by screws 40.

For assembling the swivel joint of the connector unit the neck of the swivel bolt is slipped through a slot 41 of the holder and the head or ball is seated in the socket, after which the swivel head is secured in adjusted position by means of a pair of screw plugs 42 and 43, the lower one of which has a concave or hemi-spherical bearing face on the swivel head.

By means of this swivel joint, the upper end of the trunk line hose and the lower or rear end of the pilots hose may freely swing on the single swivel support, and the initial upward movement of the seat, during the ejection operation, swings the connector from the position shown in Fig. 1 into an upright position axially alined with the component force of ejection, to assure a quick and easy disconnection of the unit 10 from the unit 9, leaving the trunk line hose anchored to the console receptacle.

Having thus fully described my invention what I claim as new and desire to secure by Letters Patent is:

1. The combination with a pilot's seat for a high-speed aircraft, a support within the cockpit of the aircraft for guiding said seat in an upward movement, and means for ejecting the seat from the cockpit, of personal equipment including a sectional oxygen hose, a connector including a pair of separable units uniting adjoining ends of the sections of the hose, means for swiveling one of said units on the seat, and means for anchoring one of said sections within the cockpit.

2. The combination with a pilot's seat for a high-speed aircraft, a support within the cockpit of the aircraft for guiding said seat in an ejecting movement, and means for ejecting the seat from said support, of personal equipment including a sectional oxygen hose of elastic and resilient material, electrical circuit wires integrated with the walls of the hose-sections, a connector including a pair of separable units uniting adjoining ends of the hose-sections, separable electrical contacts for the circuit wires mounted in said units, means for swiveling one of said units on the seat, and means for anchoring one of said hose-sections within the cockpit.

3. The combination with a pilot's seat for a high-speed aircraft, a support within the cockpit of the aircraft for guiding said seat in an ejecting movement, and means for ejecting the seat from the cockpit, of personal equipment including a trunk line hose having means for anchoring one end within the cockpit, an extension of the trunk line forming a pilots hose, a separable connector uniting adjoining ends of said hoses and including a plug-unit and a socket-unit, electrical circuit wires integrated with the walls of said hoses, separable electrical contacts mounted within said units, means for swiveling one of said units on the seat, and means for anchoring one end of the trunk line hose within the cockpit.

4. The combination with a pilot's seat for a high-speed aircraft, a support within the cockpit of the aircraft for guiding said seat in an ejecting movement, and means for ejecting the seat from the cockpit, of pilots personal equipment including a trunk line hose having one end anchored within the cockpit, a pilots hose, a separable connector consisting of a pair of units uniting adjoining ends of the hoses, and means for pivotally suspending the unit of the pilots hose on said seat.

5. In an aircraft having an ejectible pilot's seat and means for ejecting the seat, a cockpit, and a support for the seat, the combination with personal equipment including a sectional oxygen-hose, electrical circuit wires carried by the hose, and means for anchoring one end of the hose within the cockpit, of separable units connecting adjoining ends of the sectional hose, detachable electrical contacts for the wires carried by said units, and means for swivelling one of said units on the seat.

6. The combination with a pilot's seat for a high-speed aircraft, a frame within the cockpit of the aircraft for guiding said seat in an ejecting movement, and means for ejecting the seat from the cockpit, of pilots personal equipment including a sectional hose having one section detachably anchored within the cockpit and an extended section forming an ejectible pilots hose, a separable connector uniting conjoining ends of the sections, a supporting element for the hose, and a pivotal connection between said element and the separable connector adapted to permit flexing of the hose.

7. The combination with a pilot's seat for an aircraft, a support within the cockpit of the aircraft for guiding said seat in an upward movement, and means for ejecting the seat from the cockpit, of personal equipment including a sectional oxygen hose, a separable connector uniting conjoining ends of the sectional hose and including a socket-unit and a plug-unit, a swivel-bolt rigid with the plug unit and an exterior head on the bolt, and a socket-block rigid with the seat and encasing said head.

RALPH E. DARLING.

REFERENCES CITED

The following references are of record in the file of this patent:

UNITED STATES PATENTS

| Number | Name | Date |
| --- | --- | --- |
| 2,014,288 | Noschange | Sept. 10, 1935 |
| 2,178,931 | Crites et al. | Nov. 7, 1939 |
| 2,482,292 | Sabbia | Sept. 20, 1949 |
| 2,494,005 | Sabbia | Jan. 10, 1950 |
| 2,494,207 | Sabbia | Jan. 10, 1950 |
| 2,524,522 | Gilmore | Oct. 3, 1950 |